United States Patent
Hassan et al.

(10) Patent No.: US 10,681,209 B2
(45) Date of Patent: Jun. 9, 2020

(54) SEQUENCED DEVICE ALERTING

(71) Applicant: Microsoft Technology Licensing, LLC, Redmond, WA (US)

(72) Inventors: Amer A. Hassan, Kirkland, WA (US); Michael J. Davis, Seattle, WA (US); Mahendra Sekaran, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/182,295

(22) Filed: Nov. 6, 2018

(65) Prior Publication Data
US 2020/0145532 A1    May 7, 2020

(51) Int. Cl.
*H04W 68/04* (2009.01)
*H04M 3/46* (2006.01)

(52) U.S. Cl.
CPC .......... *H04M 3/46* (2013.01); *H04W 68/04* (2013.01)

(58) Field of Classification Search
CPC ..... H04M 3/46; H04W 68/04; H04W 68/005; H04W 68/00
See application file for complete search history.

(56) References Cited

U.S. PATENT DOCUMENTS

| | | | |
|---|---|---|---|
| 6,366,660 B1 | 4/2002 | Baiyor et al. | |
| 8,364,154 B1 | 1/2013 | Raghunath et al. | |
| 8,666,052 B2 | 3/2014 | Parandekar et al. | |
| 8,761,746 B2 | 6/2014 | Armstrong et al. | |
| 2009/0252317 A1 | 10/2009 | Kouchri | |
| 2014/0133363 A1 | 5/2014 | Pritchard et al. | |
| 2015/0373194 A1* | 12/2015 | Guo .................. | H04M 3/46 370/352 |
| 2016/0036476 A1 | 2/2016 | Cho et al. | |
| 2016/0072955 A1* | 3/2016 | Barkan ............ | H04M 3/42212 455/417 |
| 2016/0205244 A1* | 7/2016 | Dvortsov .......... | H04M 3/42365 455/413 |

(Continued)

OTHER PUBLICATIONS

"Configuring a Single Dialed Number on Multiple Lines", Retrieved from: https://www.cisco.com/c/en/us/support/docs/voice-unified-communications/unified-communications-manager-callmanager/14889-single-dn-muli-line-14889.html, Feb. 27, 2014, 6 Pages.

(Continued)

*Primary Examiner* — Said M Elnoubi
(74) *Attorney, Agent, or Firm* — Schwegman Lundberg & Woessner, P.A.

(57) ABSTRACT

Disclosed in some examples are methods, systems, and machine-readable mediums that assign a same identifier to a plurality of a user's communication devices. A communication server alerts only one device of the plurality of communication devices at a time in response to a communication establishment request from a calling communication device directed to the identifier. If the user fails to answer the alert, another device is chosen and alerted according to a particular sequence of devices until the user either answers or until all devices (or a determined subset of devices) have been tried. In sonic examples, the communication devices are reachable by the communication service via an alternative address known to the communication server, such as an Internet Protocol (IP) address.

17 Claims, 6 Drawing Sheets

(56) References Cited

U.S. PATENT DOCUMENTS

2017/0187870 A1\* 6/2017 Ligeret .................. H04W 4/02

OTHER PUBLICATIONS

"Sequential or Simultaneous call distribution", Retrieved from: https://www.mightycall.com/features/ringing-at-the-same-time-or-in-sequence/, Retrieved Date: Aug. 3, 2018, 9 Pages.
"Single Number Reach (Simultaneous Ring)", Retrieved from: https://its.unl.edu/images/telecom/pdf/Single%20Number%20Reach%20Instructions%20for%20Self-Care%20Portal%5B1%5D.pdf, Retrieved Date: Aug. 3, 2018, 3 Pages.
"International Search Report and Written Opinion Issued in PCT Application No. PCT/US19/058685", dated Jan. 7, 2020, 11 Pages.

\* cited by examiner

SEQUENCED DEVICE ALERTING

BACKGROUND

As computing devices have gotten more sophisticated, they have taken on new functionalities, including use as audio/visual communication devices. Due to the affordability and ubiquity of computing devices and due to their increasing use as communication devices, the number of devices used by the average person for communication has increased. It is now common for a single person to have one or more cellphones, desk phones, laptops, tablets, and desktop computing devices—all used for voice and/or video calls. Because of the ubiquity of these devices, users are more reachable than ever before.

Typically, each communication device is assigned a unique identifier that is used by a calling party to initiate communications with a called party's communication device. This unique identifier may be used to route communications packets to the called user's communication device or used to setup a circuit with the called user's communication device. Unique identifiers include Session Initiation Protocol (SIP) addresses, telephone numbers, and the like. For example, each computing device of the user may have a separate telephone number, different SIP address, or the like. To try all communicating devices of a called party, a calling party may have to both know a large list of numbers and sequentially try each number to reach a user.

Previous solutions to this problem used call forwarding set up by the user to forward calls from a computing device where the user is not present to a computing device where the user is present. This is time consuming and a user has to remember to setup the forwarding when they change locations. Other solutions include ringing all devices at once. This can be annoying for users when they are nearby multiple devices and in can be annoying for other persons nearby devices that are ringing when the user is not nearby.

BRIEF DESCRIPTION OF THE DRAWINGS

The drawings illustrate generally, by way of example, but not by way of limitation, various embodiments discussed in the present document.

DETAILED DESCRIPTION

Figure 1:
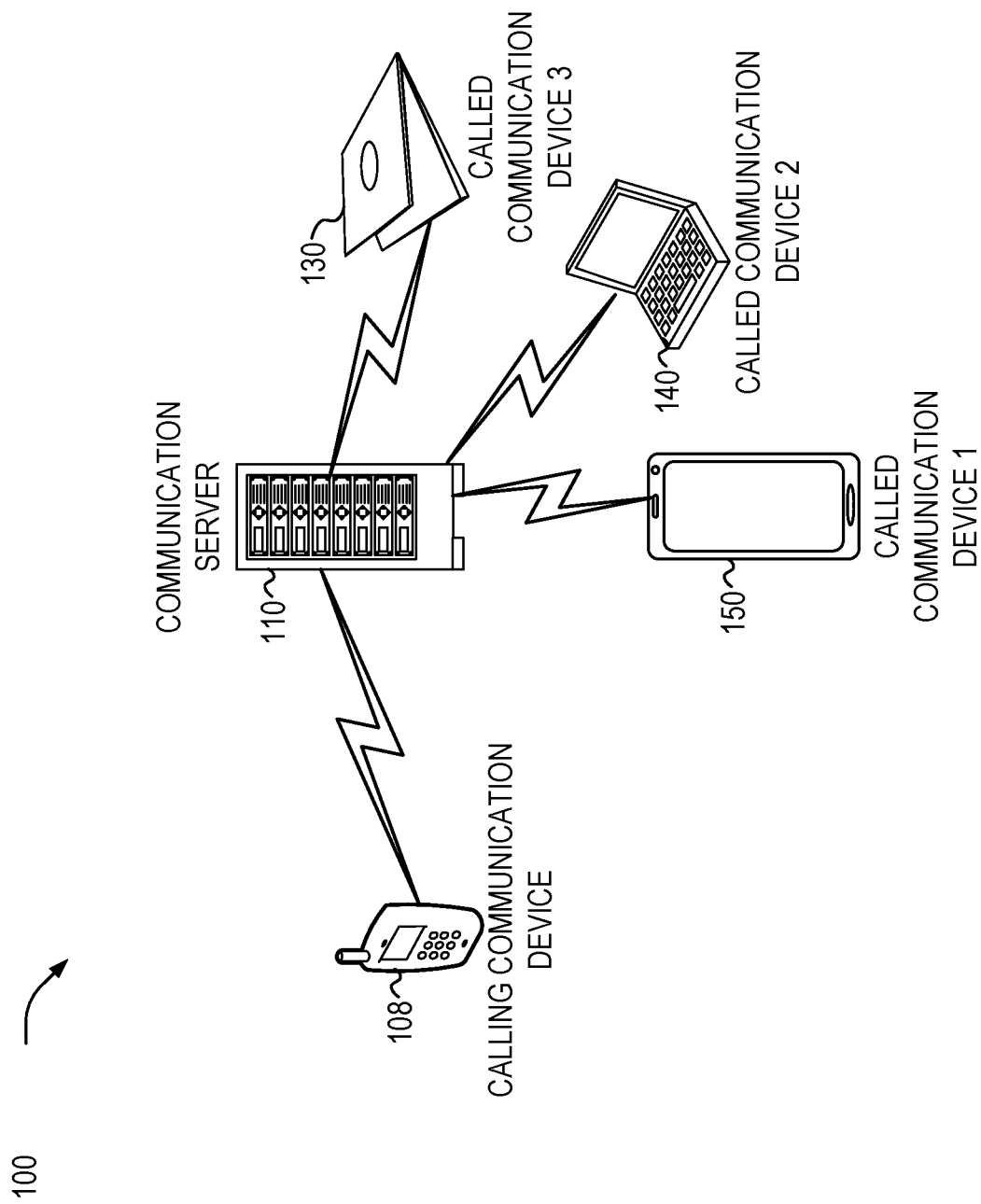
FIG. 1 shows a diagram of an environment of sequenced device alerting system according to some examples of the present disclosure.

Disclosed in some examples are methods, systems, and machine-readable mediums that assign a same identifier to a plurality of a user's communication devices. A communication server alerts only one device of the plurality of communication devices at a time in response to a communication establishment request from a calling communication device directed to the identifier. If the user fails to answer the alert, another device is chosen and alerted according to a particular sequence of devices until the user either answers or until all devices (or a determined subset of devices) have been tried. In some examples, the communication devices are reachable by the communication service via an alternative address known to the communication server, such as an Internet Protocol (IP) address.

The order in which to try the various communication devices of the user may be determined based upon one or more settings (e.g., controlled by the user or an administrator). In other examples, the order may be selected dynamically based upon one or more features. Features are any data that may be indicative of a probability that the user is likely to answer an alert sent to the device. Features may include the called user's current context, user preferences, the calling user, and the like. Example context features may include a user's location, recent activity on a device by a user, time of day, date, whether it is a weekday or weekend, historical user device usages, user preferences, and the like. For example, the system may, first pick the device that the user most recently used. If that device does not answer, then the system may next pick the next device that the user most recently used, and the like. In some examples, historical data (such as historical features) may be used to train a machine learning model. The historical features may be labeled with whether the user answered an alert, activity indications that indicate that the user is using the device, and the like. The model is then used subsequently to predict which devices to alert and in which order to alert the user at based upon their current contexts. The machine learning model may be refined over time by refining it using features such as contexts of the user labeled with the device the user answered on and/or was active on. Thus, over time, the model will get better at predicting the best device to reach the user on.

As noted, other features may include user preferences. For example, the user may instruct the system not to alert certain devices at certain times of day or locations In other examples, features may include information about the calling party. For example, certain callers may be given priority or the user may prefer certain callers be routed to certain devices (e.g., a friend may be routed to a personal device first before a work device).

In addition to selecting a device ordering, the system may determine an alert profile to alert the user. The alert profile may be different or the same across communication requests, devices, users, and the like. For example, a first alert profile may be used for the first device for a particular communication request, and then a different, second alert profile may be used for the second device (after the user fails to answer the alert on the first device) for the same communication request. An alert profile may include an alert type—e.g., sound, vibration, silent (e.g., lights), or some combination. An alert profile may also include an alert duration that specifies how long to alert the user on a particular device if they do not answer. For example, the system may alert a user for 10 seconds on a first device, but only 5 seconds on a second device.

The alert profile may also be selected based upon features such as the called user's current context, user preferences, and the device being alerted. Example context features may be the same or different context features used to determine the device ordering and may include a user's location, recent activity on a device by a user, time of day, date, whether it is a weekday or weekend, historical user device usages, historical information on which alerts are likely to be answered given a user's context, calling party information, and the like. In some examples, historical context features may be used to train a machine learning model. The machine learning model may be refined over time by using features such as contexts of the user labeled with the alert schema the user answered and a length of time that the answer took. Thus, over time, the model will get better at predicting the best schema to use in order to cause the user to answer.

Because many calling users may not be patient enough to wait for all the called user's devices to ring (if the called user does not answer immediately), the system may provide an indication to the calling user that the system is trying multiple devices and to stay on the line. In some examples, this may be indicated by different ring tones for each device, or by an audible voice indicating that the system is trying a different device, or if the user is calling via a VoIP client on a computing device with a display, the system may indicate this on the display.

This solution thus solves the technical problem of assigning a single identifier to multiple devices by utilizing a technical solution of utilizing a communication server that acts as a call endpoint for a single identifier that then maps to multiple user devices to provide a number of benefits. For example, the presently disclosed system avoids the inconvenience of the user having to remember to adjust their call forwarding settings to ring a device they are likely to answer. The presently disclosed system also improves on systems which ring all devices at once by decreasing annoyance of bystanders that may be in proximity to called devices that will not be answered as well as annoyance of users having multiple devices that may be on their persons ring simultaneously. Furthermore, by selecting a device and alert schema that is most likely to be answered, the presently disclosed system decreases network traffic as it decreases the amount of alerts that are sent.

FIG. 1 shows a diagram of an environment 100 of a sequenced device alerting system according to some examples of the present disclosure. Calling computing device 108 calls an identifier (e.g., a phone number) associated with the called user. The identifier is assigned to each of called communication devices 130, 140, and 150 of the user. The call gets routed to the communication server 110 (e.g., a Session Initiation Protocol (SIP) registrar may list the SIP address corresponding to the identification as the address of the communication server 110). The communication server 110 may then select one of the called communication devices 130, 140, or 150 to alert first and may select the alert schema for that device. If the user does not pick up after a determined amount of time, the communication server 110 may then cease alerting the user on the first selected device and select a second of the called communication devices 130, 140, or 150 and so on until the user answers or all devices have been alerted in sequence. If the user answers the alert, the communication session may be set up between the calling computing device 108 and the called computing device of the user that answered. The communication server 110 may translate the calling identifier into a second address (e.g., such as an IP address, an International Mobile Subscriber Identity IMSI, or the like) that is then used by the communication server 110 to alert the called user devices. The communication server 110 thus acts as an intermediate device by acting as an endpoint for the first identifier used by the calling computing device 108 to reach the user and then forwarding that request to a second identifier to actually reach the communication devices of the called user.

The user communication devices may be reached by the communication server 110 in a number of different ways. For example, one or more of the called user communication devices may be a cellular telephone reachable over a cellular network. In these examples, the communication server may contact the cellular telephone using an IMSI address. Other devices may be VoIP devices with VoIP client applications. These devices may be reachable via an IP address. In some examples, the communication server 110 may be a Mobile Switching Center (MSC), a VoIP server, or the like.

Figure 2:
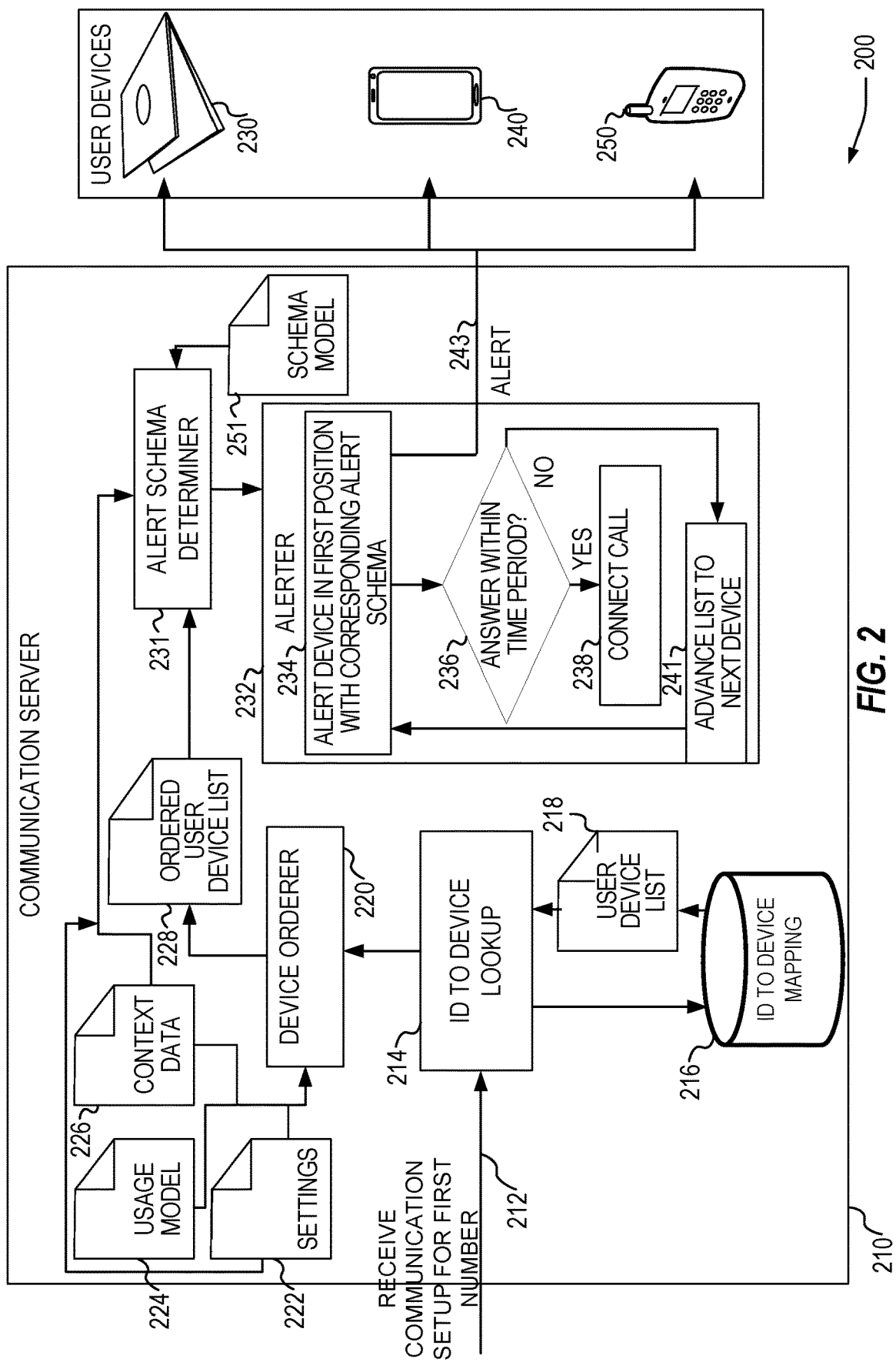
FIG. 2 shows a logical diagram of an environment of a sequenced device alerting system according to some examples of the present disclosure.

FIG. 2 shows a logical diagram of an environment 200 of a sequenced device alerting system according to some examples of the present disclosure. Communication server 210 may be an example of communication server 110. Communication server 210 receives a communication setup request 212 (e.g., a SIP INVITE request). The ID to device lookup component 214 may query the ID to device mapping data store 216 for a user device list 218. The user device list 218 may include the user's devices and associated IP addresses (or other routing address such as an IMSI). In some examples, the user device list may include information about each device, such as a device type. This list may be passed to the device orderer 220. Device orderer 220 utilizes one or more of usage model 224, user settings 222, or user context data 226 to order the user device list 218 into ordered user device list 228. The list is ordered in a manner indicating a sequence for alerting the devices. For example, the device to alert first is listed first, the device to alert second is listed second, and so on. As previously noted, the ordering may be based upon the recency with which the devices were used. The most recently used device is alerted first, the second most recently used device is alerted second, and so on. The device usage data may be part of user context data 226. In other examples (and as explained herein) other features are used to order the devices.

Alert schema determiner 231 may utilize the user context data 226, user settings 222, and in some examples schema model 251 to select an alert schema for one or more devices on the ordered user device list. Alert schemas may feature alert types that indicate how the user is to be alerted, Example alert types may include auditory, visual, vibratory, or any combination. For example, the alert may activate the device's ringtone, vibrator, Light Emitting Diodes (LEDs), a message on a display, or the like. Various combinations of different types may be utilized, for example, vibration and ringing, and the like. The alert schema may also include a delay time that determines how much time to give the user to answer a particular device. The delay time may be constant—e.g., a predetermined time or may be variable dependent on the device, the context of the user, and the settings. Both the type of alert and the delay time may be based upon the context of the user, settings of the user, and the like. For example, the context of the user may include that the user is in a face-to-face meeting. The device that the user normally takes to meetings may be alerted first and the context selects the alert type to be a vibration alert for a short period of time (so as not to distract the user should the user not want to accept the call).

The user context data 226 may be ascertained from the user's devices and the activity of the user on those devices as well as other associated accounts and services that the user is connected to. For example, user context data 226 may include calendar data, email data, instant messaging data (e.g., a presence indication), and the like.

In some examples, the schema model 251 may be a machine learned model that uses historical data such as the ring types and ring durations that in the past were more likely to get a user to answer for a particular user context. For example, if the device is a cellphone and the user keeps the cellphone in their pocket, it may take a few moments to get it out of their pocket. Thus, the system may learn that it takes the user longer to answer the user's cellphone and thus may set the delay period longer for the cellphone than other devices (such as a desk phone).

While in some examples, the alert schema may be selected for each device, in other examples, the alert schema may be static. In still other examples, the alert schema is not selected by the communication server 210 but is controlled by the user communication devices based upon user input.

The alert schemas may be sent to the alerter 232 along with the ordered user device list 228. The alerter may utilize the IP address to alert one or more user devices 230, 240, or 250 using alert 243. For example, at operation 234 the device in the first position of the ordered user device list may be alerted. A determination is made at operation 236 if the device answered within the delay time period indicated in the alert schema for that device. If not, then the list is advanced to the next device at operation 241, which is alerted at operation 234 with the alert schema for that device. This process is repeated until the user answers, in which case the call is connected at operation 238, or there are no more devices, in which case the call is rejected (not shown for clarity).

Figure 3:
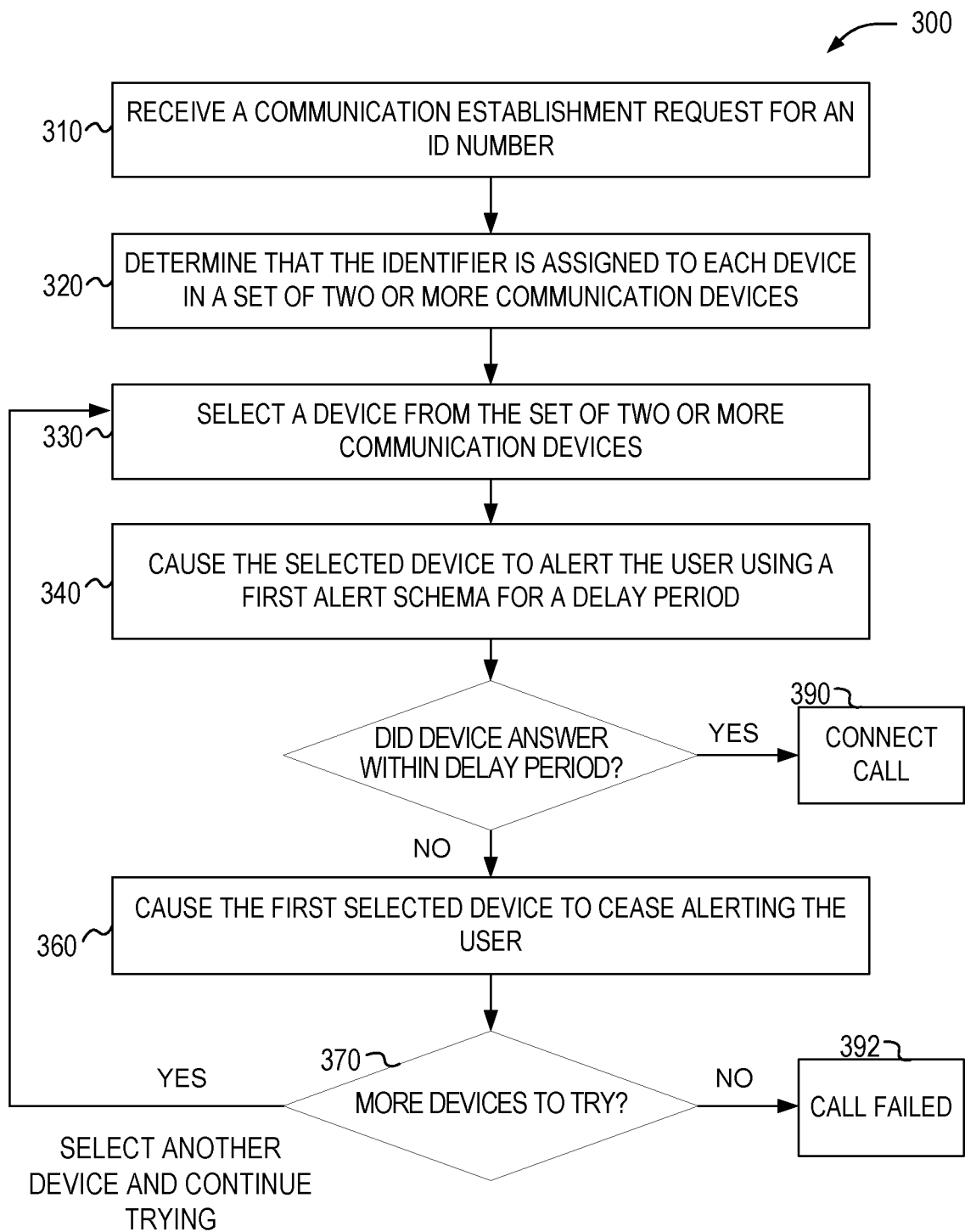
FIG. 3 shows a method of sequenced device alerting according to some examples of the present disclosure.

FIG. 3 shows a method 300 of sequenced device alerting according to some examples of the present disclosure. The method 300 may be performed by the communication server 210 of FIG. 2. At operation 310 the server may receive a communication establishment request for an identification number registered to a user. For example, the server may receive a setup request for a telephone number, a SIP ID, or the like. At operation 320 the server may determine that the identifier is assigned to each device in a set of two or more communication devices. For example, the server may have a mapping between devices and the identification number as well as a listing of alternative addresses to contact the various devices. At operation 330 the communication server may select a first device from the set of two or more communication devices. For example, based upon features such as context data and user settings. Context data may include location, time of day, appointments in a calendar service, device usage recency, detected motion of the user, learned device preferences of the user, and the like.

Example selections based upon context data include one or more of: selecting the device that was used most recently, selecting the device most frequently used at the user's current time of day and/or location, selecting a mobile device if the user is known to be out of the office (based upon the user's location, calendar, or both), selecting a desktop device if the user is known to be in the office (based upon the user's location, calendar, or both), selecting a user's favorite device (determined based upon past frequency of device usage), and the like. These selections may be determined based upon one or more if-then-rules that determine a selection based upon the inputted context. For example, if <device X was the most recently used device> then <select it first>. These rules may be created by an administrator of the system, a programmer of the system, or the user (e.g., through a. GUI). These rules may be arranged in a hierarchy such that a true or false evaluation of one rule may cause evaluation of another title.

In other examples, each device may be scored using the various context data by converting each feature to a numerical value, weighted with a set of weights, and summed. The devices may be tried in descending order of device score. As an example of converting a feature to a numerical value, if the user is out of the office, a value of 1 is assigned to that feature for a mobile device, otherwise a value of 0 is assigned to that feature if the device is not a mobile device. Similarly, for features related to recency of use, the more recent the usage the higher the score for that feature. Weights may be assigned by an administrator, user, or learned via a machine learning algorithm such as a regression algorithm or artificial neural network.

In some examples, features of the user including the user's current context may be submitted as input to a model trained by one or more machine learning algorithms using past historical feature data for the particular user. The model may output a selection of a computing device of the user to alert that the model predicts will be successful in alerting the user. In other examples, the model outputs a list of devices in an order from most likely to least likely to be successful in alerting the user given current user features (including user contexts).

In one example, the model is a decision tree. In other examples, the model may be a model that assigns probabilities that a user may answer the communication event for a given device. The system may select the device with the highest probability of answering. In still other examples, the model may be an artificial neural network, such as a convolutional neural network. The model may be trained based upon historical features including context data labeled with whether the user answered and on which device. In some examples, the label may include activity in addition to whether the user answered. In these examples, the model predicts a probability that the user would be active on a particular device. In examples in which both labels are used, the labels may be weighted such that answering a communication event may have a greater effect on the model than other user activity.

In some examples, in addition to using the user's own preferences (as demonstrated by past behavior) and usage histories to determine a model, behaviors of other users in the system may also be used. The behaviors of other users may be weighted in generating the model based upon the similarities of each particular user and the user for whom the model is generated. For example, if user A and user B are similar, then user B's past behaviors with respect to communications may be weighted more highly in determining a model for selecting a device for user A than a third user, user C that is less similar to A than user B. Similarity (and the weights used) may be determined based upon user profile information including a user's company, user locations, user job titles, user relationships (e.g., connections on a social networking service), past behavior data, and the like. Similarity may be determined using a k-nearest neighbor algorithm. By utilizing additional training data from additional users, the system may more rapidly learn a model for the user and avoid the cold start problem with machine learning algorithms.

While the above discussion mentioned "selecting" a particular device, it will be appreciated by a person of ordinary skill with the benefit of the present disclosure that selecting may also be accomplished by using the above algorithms to order the list of devices (e.g., as shown in FIG. 2). The order may be based upon the predictions e.g., the first device in the list may be the device that is predicted to be the best, the second device is the next device after the first device that is predicted to be the best, and so on.

At operation 340 the system may cause the first selected device to alert the user using a first alert schema for a determined period of time or until the user answers, Each device may have an alternate identifier associated with it that serves as an address (such as an IP address, or the like) to allow the communication server 210 to reach it and allows for establishment of communications with the calling device. This alternate identifier is used by the communication server to send the call setup request to the device. The device then alerts the user using the alert schema. The alert schema may be set by the device or may be selected by the communication server and indicated in the communication setup request.

The alert schema may be selected based upon the device that is being alerted. That is, certain devices may have supported alert types (e.g., visual, audio, audiovisual, tactile, and the like). Additionally, the user may have certain preferences for certain alert types on certain devices which may be learned by the system based upon past history of the user. In addition, the alert schema may be selected based upon context data of the user. If the user is in an in-person meeting, the alert schema may be set to vibrate or some other non-auditory alert to avoid disturbing others in the meeting. If the user is in a crowded airport, the system may alert the user using an auditory alert (the volume may also be modified based upon the context). As with the device selection, the alert schema may be selected based upon if-then rules, machine learned models such as decision trees, regression, and artificial neural networks. In addition, the model may be based upon the user's past behaviors or a group of user's past behaviors, or the like. As with the device selection the similarity of each user in the group to the user that is the subject of the model may affect a weight given to the preferences of those users in the group. In some examples, rather than having two separate models: one for the device and one for the alert schema, a single model may select both the device and the alert schema.

As previously discussed, the alert schema may include not only a type of alert, but also a duration with which the alert is provided to the user. The duration may be selected based upon the previous mentioned contextual information, user preferences, models, and the like. For example, the system may determine that a user may take more time to answer a particular device given a particular alert type. Thus, the system may set the alert time period to be a greater amount of time than may be set for a different device that is typically answered by the user faster.

If the device answers the alert within the delay time period, then at operation 390 the call may be connected. By answering, it is meant that the communication server has received and the communication device has sent an indication that the user has provided a user input indicating a desire to answer the communication. For example, a user may pick up an earpiece of a phone, press a button, or the like. In response to this input, the communications device may then send a protocol message indicating that the device has been answered (e.g., an "OK" SIP message) which may be forwarded to the calling party. The calling party may then be notified by forwarding this message. In some examples, the message is forwarded and the address (IP address) of the device is also provided so that subsequent communications may be made in a peer-to-peer manner.

If the device does not answer after the delay period, then at operation 360 the first device may be caused to cease alerting the user at the conclusion of the delay time period. For example, the communication server may send a message (e.g., a SIP "BYE" message) that terminates alerting the user. At operation 370, a determination is made whether any more devices associated with the user have not yet been tried. If no, then at operation 392 the call is failed. If yes, then control proceeds to operation 330 to select another (e.g., a second, third, fourth, etc. . . . ) user device which is alerted at operation 340.

Figure 4:
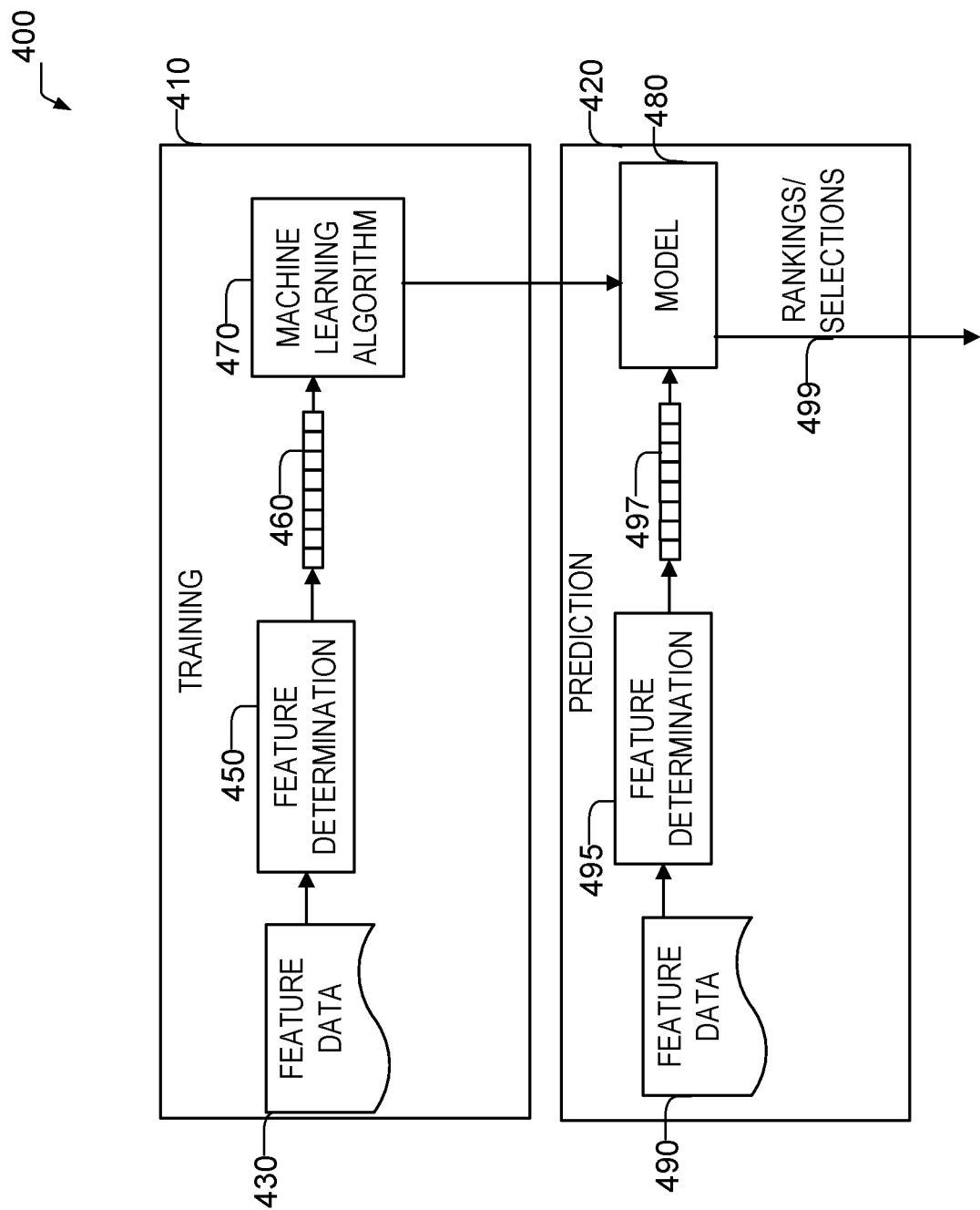
FIG. 4 shows an example machine learning module according to some examples of the present disclosure.

As noted previously various aspects of the present disclosure may utilize one or more machine learning models learned by one or more machine learning algorithms. For example, a device from the group of devices may be selected based upon a machine learned model. Additionally, one or more alert schemas may be selected based upon the machine learned model. FIG. 4 shows an example machine learning module 400 according to some examples of the present disclosure. The machine learning module 400 may be implemented in whole or in part, by the communication server, such as communication servers 110 and 210. In some examples, the training module 410 may be implemented by a different device than the prediction module 420. In these examples, the model 480 may be created on a first machine and then sent to a second machine.

Machine learning module 400 utilizes a training module 410 and a prediction module 420. Training module 410 inputs feature data 430 into feature determination module 450. The feature data 430 includes user contexts, settings, and the like. In some examples, the feature data may be explicitly labeled with which device the user answered communication requests from, used to communicate with, or otherwise interacted with, given the context.

Feature determination module 450 determines one or more features for feature vector 460 from the feature data 430. Features of the feature vector 460 are a set of the information input and is information determined to be predictive of a relevant device and/or alert schema selections. Features chosen for inclusion in the feature vector 460 may be all the feature data 430 or in some examples, may be a subset of all the feature data 430. In examples in which the features chosen for the feature vector 460 are a subset of the feature data 430, a predetermined list of which feature data 430 is included in the feature vector may be utilized. The feature vector 460 may be utilized (along with any applicable labels) by the machine learning algorithm 470 to produce a model 480.

In the prediction module 420, the current feature data 490 of the user may be input to the feature determination module 495. Feature determination module 495 may determine the same set of features or a different set of features as feature determination module 450. In some examples, feature determination module 450 and 495 are the same modules or different instances of the same module. Feature determination module 495 produces feature vector 497, which are input into the model 480 to rankings or selections of devices and/or alert schemas 499.

The training module 410 may operate in an offline manner to train the model 480. The prediction module 420, however, may be designed to operate in an online manner. It should be noted that the model 480 may be periodically updated via additional training and/or user feedback. For example, additional feature data 430 may be collected as users interact (e.g., communicate) with various devices in various contexts. The user's context and device interactions may then be fed back through the training module 410 labelled with device interactions in order to refine the model 480.

The machine learning algorithm 470 may be selected from among many different potential supervised or unsupervised machine learning algorithms. Examples of supervised learning algorithms include artificial neural networks, convolutional neural networks, Bayesian networks, instance-based learning, support vector machines, decision trees (e.g., iterative Dichotorniser 3, C4.5, Classification and Regression Tree (CART), Chi-squared Automatic Interaction Detector (CHAIR), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training module 410.

In sonic examples, the model 480 may select a device or rank a list of devices in an order indicative of which devices should be tried and in which order. In some examples, the model 480 may select an alert schema for a particular device (the particular device may be part of feature data 430, 490). In some examples, the model 480 may both select or rank the devices and the alert schema.

Figure 5:
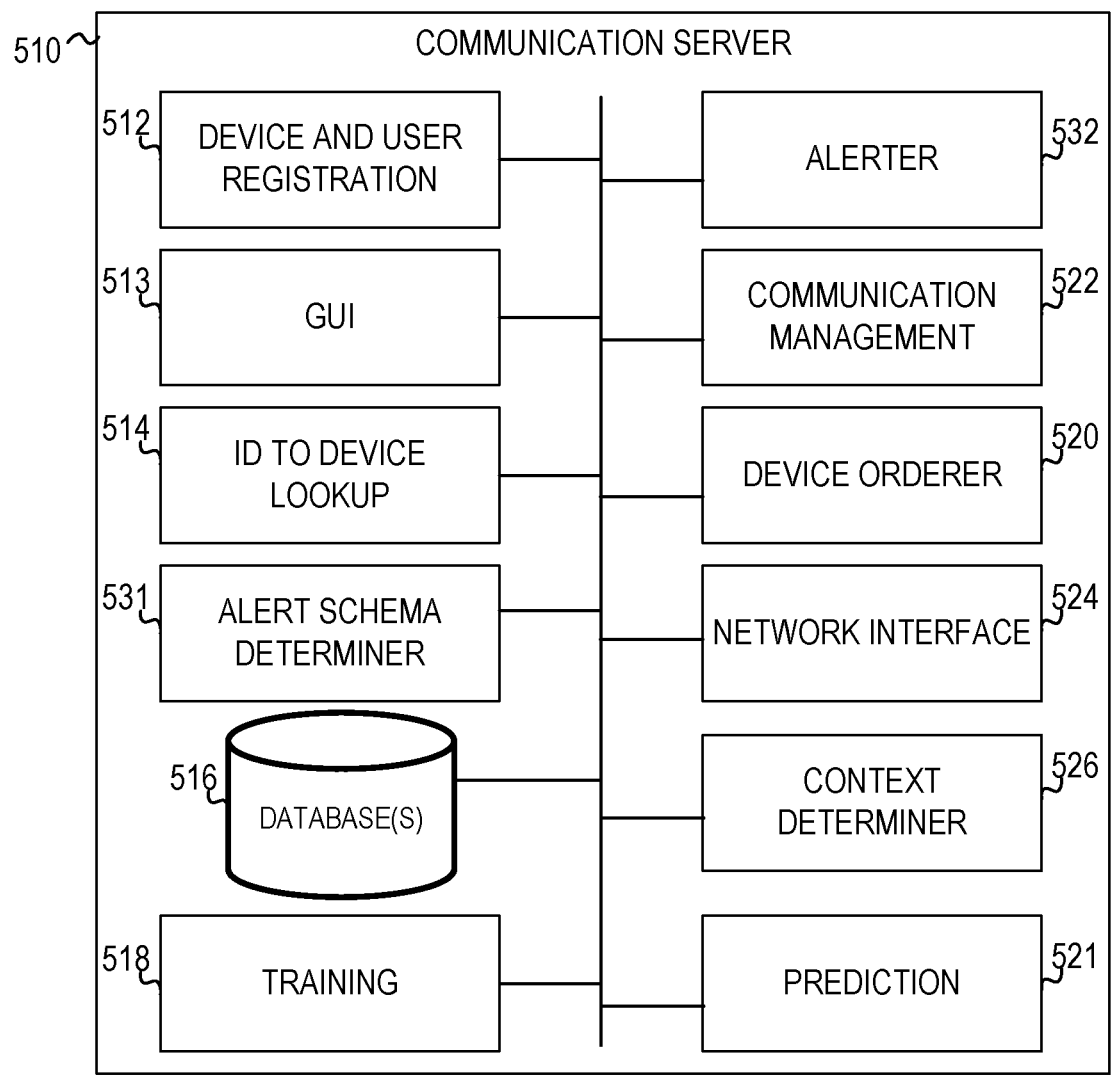
FIG. 5 shows a logical schematic of an example communication server and user device.
Figure 5:
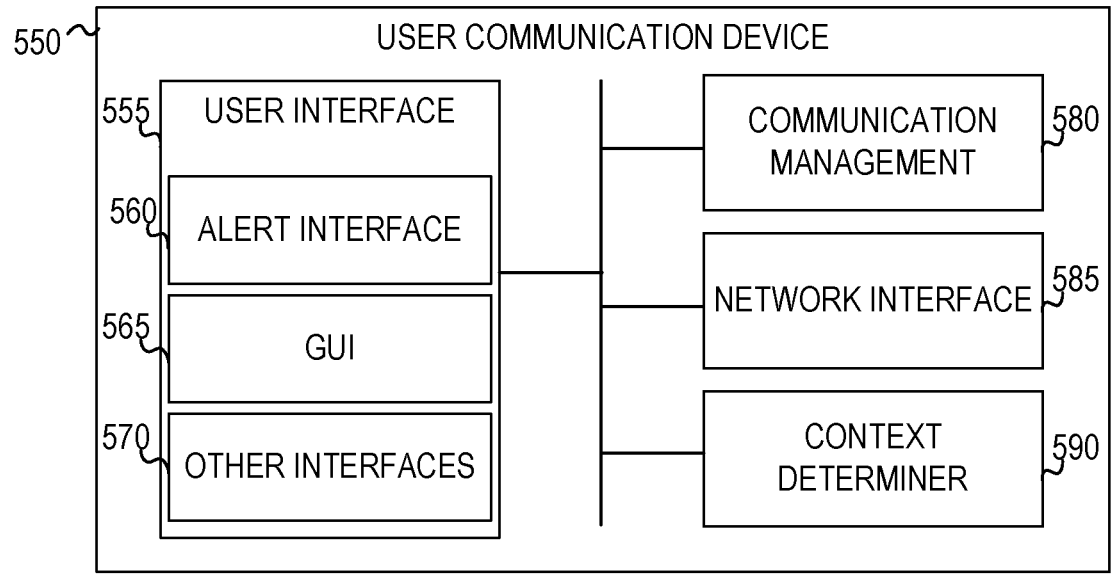

FIG. 5 shows a logical schematic of an example communication server 510 and user communication device 550. In some examples, the communication server 510 may be an example of communication server 110 and 210 and may implement the methods of FIG. 3. Training component 518 may be one example of training module 410 and prediction component 521 may be one example of prediction module 420. Communication server 510 may include a device and user registration component 512. This component may register and associate devices with a first identifier (e.g., first phone number) and a user account and store those associations in the database(s) 516 (which may include an ID to Device mapping such as stored by II) to device mapping data store 216). This registration may be done automatically by the device or may be done by an administrator or a user through using a GUI. For example, a GUI provided by the GUI component 513.

GUI component 513 may provide one or more GUIs to one or more users. In some examples, GUI component 513 may provide one or more GUI descriptors that are displayed by a remote client computing device. GUI descriptors specify one or more GUI displays including input boxes, dialogs, and controls. Values selected or entered into these input boxes, dialogs, and controls may be sent to the communication server 510. Example GUI descriptors include one or more HyperText Markup Language (HTML) files, scripting files, JavaScript files, Java files, Cascading Style Sheets (CSS), and the like.

ID to device lookup component 514 may be an example of ID to device lookup component 214 of FIG. 2 and may return a list of communication devices and their addresses associated with an identification included in a communication setup request (e.g., a phone number, SIP address, or the like). Device orderer component 520 may be an example of device orderer 220 of FIG. 2 and may use one or more features such as context data of the user, settings, and the like to determine which device of the user to alert when an incoming communication request is received. Alert schema determiner 531 may utilize the same or other features to determine an alert schema for alerting the user on the device. Alerter 532 may be an example of alerter 232 of FIG. 2 and may alert the requested device using the alert schema selected by the alert schema determiner 531. Context determiner 526 may determine one or more contexts of one or more users to be used in selecting devices and alert schemas. Contexts may be determined in coordination with context determiner 590 of user devices such as user communication device 550. Contexts may be determined by communicating with other services, such as a calendar service to determine a user's schedule, a presence service to determine a user's presence (away, busy, etc. . . . ), a social networking service, or the like. Context determiner 590 of user communication device 550 may provide sensor data such as Global Positioning System (GPS) sensor data for a user's location, user motion tracking, telemetry data, activity levels, communication activity, and the like.

Communication management component 522 may manage one or more communication events (e.g., call setups, alerting a user, and the like) and in the case of a centralized client-server communication model may handle call setup and route traffic. In a peer-to-peer communication model the communication management component 522 may assist in setting up the communication and then hand off to the peer devices.

Network interface 524 may send or receive packets to and from calling and called devices. For example, network interface 524 may implement one or more communications protocols such as Session Initiation Protocol, Signaling System Number Seven (557) protocol, Internet Protocol, Transmission Control Protocol, Real-Time Transport Protocol, various Peer to Peer protocols, Hyper Text Transfer Protocol, and the like. In some examples, network interface 524 may also provide one or more webservers that may provide GUI descriptors created by the GUI component 513. For example, device registration and configuration GUIs.

User communication device 550 may include a user interface component 555 which may include an alert interface 560 that may include visual, auditory, vibratory, or other alerts. For example, alert interface 560 may provide one or more alerts as a result of a notification, or in accordance with an alert schema identified by a communication setup request. GUI 565 may provide one or more GUIs, for example, by displaying one or more GUI descriptors received from the communication server 510, or a GUI associated with an application executing on the user communication device 550, such as provided by a communication application such as communication management component 580. Other interfaces 570 may include touch screens, voice integration, buttons, and other ways of receiving input and providing output to the user communication device 550.

Communication management component 580 may receive communication messages, such as SIP messages, RTP packets, and other communications packets and handle them accordingly, such as outputting information to the user interface provided by user interface component 555 such as alerting the user using alert interface 560, GUI 565, or the like. Communication management component 580 may play communications received in communication packets through one or more speakers or display it on a GUI 565, or the like. Communication management may also package audio or other communications received from the user interface (either from a microphone, typed in, or the like) and packetize and transmit the user's communications. Communication management component 580 may handle setting up, maintaining, and tearing down communication sessions.

Network interface 585 may send or receive packets to and from other communication devices. For example, network interface 585 may implement one or more communications protocols such as Session Initiation Protocol, Signaling System Number Seven (SS7) protocols, Internet Protocol, Transmission Control Protocol, Real-Time Transport Protocol, various Peer to Peer protocols, Hyper Text Transfer Protocol, and the like. As previously noted the context determiner 590 may collect context information about the user and transmit it (via the network interface 585) to the communication server.

The use of user data may be governed by one or more privacy settings of the user. For example, one or more GUIs may be presented that allow the user to allow, selectively allow (according to defined conditions), or deny the use of such data in making device selection and alert schema selection decisions. Additionally, any such data, including any predictive models, may be encrypted and secured so as to protect user privacy. Additionally, the user may change their mind at any time and disallow access previously given. Furthermore, users may remove stored data and one or more models.

Figure 6:
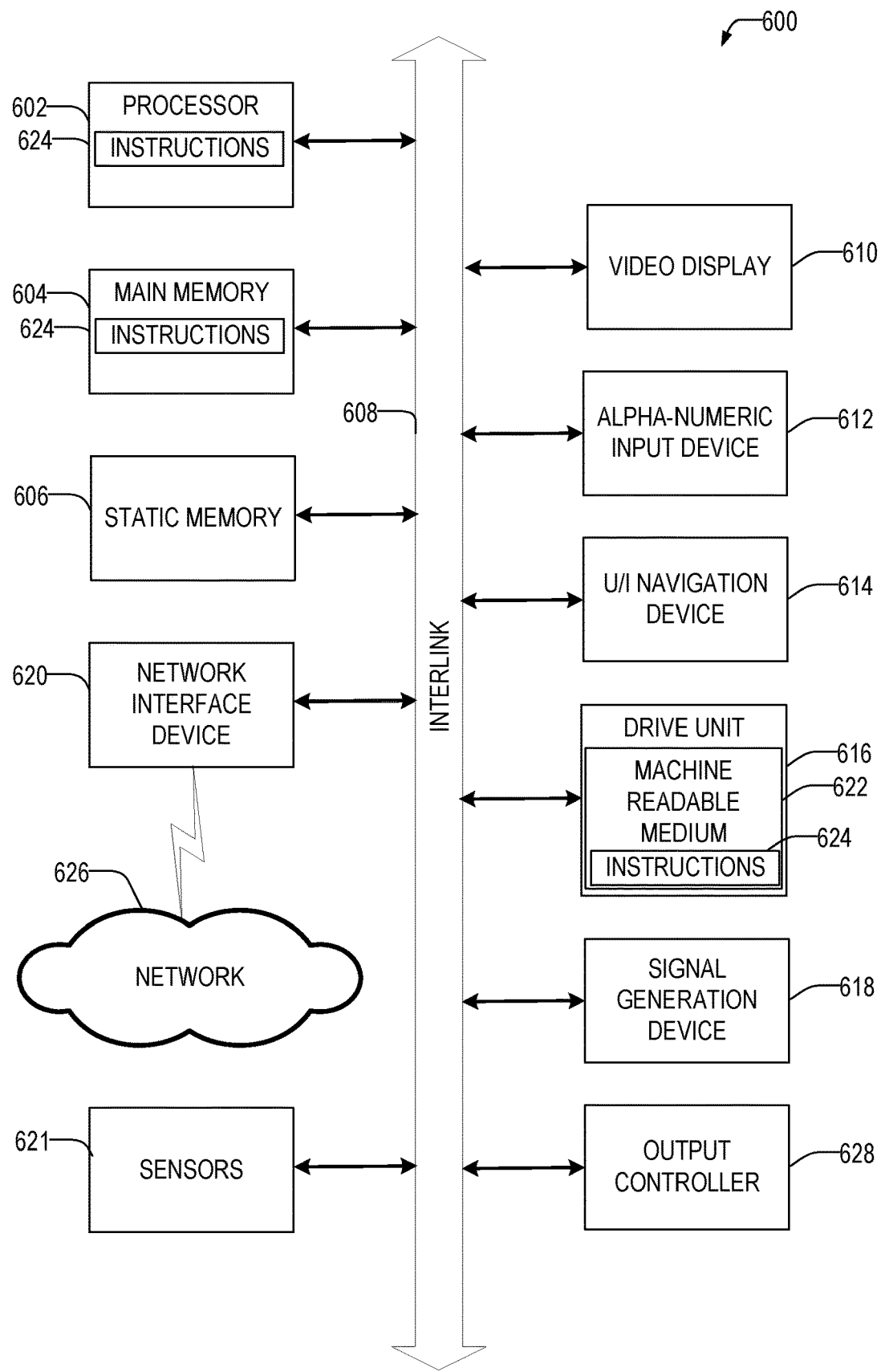
FIG. 6 is a block diagram illustrating a machine upon which one or more embodiments may be implemented according to some examples of the present disclosure.

FIG. 6 illustrates a block diagram of an example machine 600 upon which any one or more of the techniques (e.g., methodologies) discussed herein may perform. Communications devices and/or communications server may be an example implementation of machine 600. Components shown in FIG. 6 are exemplary of various components that may be in the machine and a communications server may have different components than a communications device. Machine 600 may implement the communications server 210, perform the method of FIG. 3, include the machine learning elements of FIG. 4, and implement the user communication device 550 or communication server 510. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may take the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components; modules, or mechanisms (hereinafter "modules") Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620, The Machine 600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LIE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

OTHER NOTES AND EXAMPLES

Example 1 is a method for selective ringing of computing devices in response to a communication request, the method comprising: receiving a communication establishment request directed to an identifier; the identifier assigned to each device in a set of two or more computing devices; selecting a first selected device from the set of two or more computing devices; causing the first selected device to alert a user to the communication establishment request using a first alert schema; after waiting a first delay period specified by the first alert schema without receiving an indication from the first selected device that the user is answering the communication establishment request: causing the first selected device to cease alerting the user; and causing a second selected device from the set of two or more computing devices to alert the user to the communication establishment request using a second alert schema.

In Example 2, the subject matter of Example 1 includes, selecting the first selected device based upon learned device preferences of the user or based on a device from the set of computing devices that is most recently used for establishing communication; or a device from the set of computing devices having most recent activities.

In Example 3, the subject matter of Example 2 includes, wherein selecting the first selected device based upon learned device preferences of the user comprises also selecting the device based upon a context of the user.

In Example 4, the subject matter of Examples 2-3 includes, wherein selecting the first selected device based upon learned device preferences of the user comprises also selecting the device based upon a context of the user.

In Example 5, the subject matter of Examples 1-4 includes, wherein the first delay period is selected based upon learned device behaviors of the user.

In Example 6, the subject matter of Examples 1-5 includes, wherein the first and second alert schemas are different alert schemas.

In Example 7, the subject matter of Example 6 includes, wherein the first and second alert schemas are chosen based upon learned device behaviors of the user.

In Example 8, the subject matter of Examples 6-7 includes, wherein the first and second alert schemas are also chosen based upon a context of the user.

In Example 9, the subject matter of Examples 1-8 includes, wherein the first alert schema comprises one of: auditory or non-auditory notification.

In Example 10, the subject matter of Examples 1-9 includes, wherein the first alert schema comprises combinations of auditory and non-auditory notifications.

Example 11 is a computing device comprising: a processor; a memory storing instructions, which when executed by the processor; cause the computing device to perform operations comprising: receiving a communication establishment request directed to an identifier, the identifier assigned to each device in a set of two or more computing devices; selecting a first selected device from the set of two or more computing devices; causing the first selected device to alert a user to the communication establishment request using a first alert schema; after waiting a first delay period specified by the first alert schema without receiving an indication from the first selected device that the user is answering the communication establishment request: causing the first selected device to cease alerting the user; and causing a second selected device from the set of two or more computing devices to alert the user to the communication establishment request using a second alert schema.

In Example 12, the subject matter of Example 11 includes, wherein the operations further comprise: selecting the first selected device based upon learned device preferences of the user or based on a device from the set of computing devices that is most recently used for establishing communication, or a device from the set of computing devices having most recent activities.

In Example 13, the subject matter of Example 12 includes, wherein the operations of selecting the first selected device based upon learned device preferences of the user comprises also selecting the device based upon a context of the user.

In Example 14, the subject matter of Examples 12-13 includes, wherein the operations of selecting the first selected device based upon learned device preferences of the user comprises also selecting the device based upon a context of the user.

In Example 15, the subject matter of Examples 11-14 includes, wherein the first delay period is selected based upon learned device behaviors of the user.

In Example 16, the subject matter of Examples 11-15 includes, wherein the first and second alert schemas are different alert schemas.

In Example 17, the subject matter of Example 16 includes; wherein the first and second alert schemas are chosen based upon learned device behaviors of the user.

In Example 18, the subject matter of Examples 16-17 includes, wherein the first and second alert schemas are also chosen based upon a context of the user.

In Example 19, the subject matter of Examples 11-18 includes, wherein the first alert schema comprises one of: auditory or non-auditory notification.

In Example 20, the subject matter of Examples 11-19 includes, wherein the first alert schema comprises combinations of auditory and non-auditory notifications.

Example 21 is a machine-readable medium comprising: a processor; a memory storing instructions, which when executed by the processor, cause the machine-readable medium to perform operations comprising: receiving a communication establishment request directed to an identifier, the identifier assigned to each device in a set of two or more machine-readable mediums; selecting a first selected device from the set of two or more machine-readable mediums; causing the first selected device to alert a user to the communication establishment request using a first alert schema; after waiting a first delay period specified by the first alert schema without receiving an indication from the first selected device that the user is answering the communication establishment request: causing the first selected device to cease alerting the user; and causing a second selected device from the set of two or more machine-readable mediums to alert the user to the communication establishment request using a second alert schema.

In Example 22, the subject matter of Example 21 includes, wherein the operations further comprise: selecting the first selected device based upon learned device preferences of the user or based on a device from the set of machine-readable mediums that is most recently used for establishing communication, or a device from the set of machine-readable mediums having most recent activities.

In Example 23, the subject matter of Example 22 includes, wherein the operations of selecting the first selected device based upon learned device preferences of the user comprises also selecting the device based upon a context of the user.

In Example 24 the subject matter of Examples 22-23 includes, wherein the operations of selecting the first selected device based upon learned device preferences of the user comprises also selecting the device based upon a context of the user.

In Example 25, the subject matter of Examples 21-24 includes, wherein the first delay period is selected based upon learned device behaviors of the user.

In Example 26, the subject matter of Examples 21-25 includes, wherein the first and second alert schemas are different alert schemas.

In Example 27, the subject matter of Example 26 includes, wherein the first and second alert schemas are chosen based upon learned device behaviors of the user.

In Example 28, the subject matter of Examples 26-27 includes, wherein the first and second alert schemas are also chosen based upon a context of the user.

In Example 29, the subject matter of Examples 21-28 includes, wherein the first alert schema comprises one of: auditory or non-auditory notification.

In Example 30, the subject matter of Examples 21-29 includes, wherein the first alert schema comprises combinations of auditory and non-auditory notifications.

Example 31 is a computing device for selective ringing of computing devices in response to a communication request, the computing device comprising: means for receiving a communication establishment request directed to an identifier, the identifier assigned to each device in a set of two or more computing devices; means for selecting a first selected device from the set of two or more computing devices; means for causing the first selected device to alert a user to the communication establishment request using a first alert schema; after waiting a first delay period specified by the first alert schema without receiving an indication from the first selected device that the user is answering the communication establishment request: means for causing the first selected device to cease alerting the user; and means for causing a second selected device from the set of two or more computing devices to alert the user to the communication establishment request using a second alert schema.

In Example 32, the subject matter of Example 31 includes, means for selecting the first selected device based upon learned device preferences of the user or based on a device from the set of computing devices that is most recently used for establishing communication, or a device from the set of computing devices having most recent activities.

In Example 33, the subject matter of Example 32 includes, wherein the means for selecting the first selected device based upon learned device preferences of the user comprises also selecting the device based upon a context of the user.

In Example 34, the subject matter of Examples 32-33 includes, wherein the means for selecting the first selected device based upon learned device preferences of the user comprises also selecting the device based upon a context the user.

In Example 35, the subject matter of Examples 31-34 includes, wherein the first delay period is selected based upon learned device behaviors of the user.

In Example 36, the subject matter of Examples 31-35 includes, wherein the first and second alert schemas are different alert schemas.

In Example 37, the subject matter of Example 36 includes, wherein the first and second alert schemas are chosen based upon learned device behaviors of the user.

In Example 38, the subject matter of Examples 36-37 includes, wherein the first and second alert schemas are also chosen based upon a context of the user.

In Example 39, the subject matter of Examples 31-38 includes, wherein the first alert schema comprises one of: auditory or non-auditory notification.

In Example 40, the subject matter of Examples 31-39 includes, wherein the first alert schema comprises combinations of auditory and non-auditory notifications.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

What is claimed is:

1. A method for sequential ringing of computing devices in response to a communication request, the method comprising:
   receiving a communication establishment request directed to an identifier, the identifier assigned to each device in a set of two or more computing devices;
   selecting a first selected device from the set of two or more computing devices using a model trained with past device answer history that predicts, given a present context of a user, a device that will be successful in alerting the user;
   causing the first selected device to alert the user to the communication establishment request using a first alert schema, wherein the devices in the set of two or more computing devices other than the first selected device are not caused to alert;
   after waiting a first delay period specified by the first alert schema without receiving an indication from the first selected device that the user is answering the communication establishment request:
   causing the first selected device to cease alerting the user; and
   causing a second selected device from the set of two or more computing devices to alert the user to the communication establishment request using a second alert schema.

2. The method of claim 1, wherein the first delay period is selected based upon learned device behaviors of the user.

3. The method of claim 1, wherein the first and second alert schemas are different alert schemas.

4. The method of claim 3, wherein the first and second alert schemas are chosen based upon learned device behaviors of the user.

5. The method of claim 3, wherein the first and second alert schemas are also chosen based upon a context of the user.

6. The method of claim 1, wherein the first alert schema comprises one of: auditory or non-auditory notification.

7. The method of claim 1, wherein the first alert schema comprises combinations of auditory and non-auditory notifications.

8. The method of claim 1, further comprising:
   selecting the second selected device from the set of two or more computing devices using the model trained with past device answer history that predicts, given the present context of the user, a device that will be successful in alerting the user.

9. A computing device comprising:
   a processor;
   a memory storing instructions, which when executed by the processor, cause the computing device to perform operations comprising:
      receiving a communication establishment request directed to an identifier, the identifier assigned to each device in a set of two or more computing devices;
      selecting a first selected device from the set of two or more computing devices using a model trained with past device answer history that predicts, given a present context of a user, a device that will be successful in alerting the user;
      causing the first selected device to alert the user to the communication establishment request using a first alert schema, wherein the devices in the set of two or more computing devices other than the first selected device are not caused to alert;
      after waiting a first delay period specified by the first alert schema without receiving an indication from the first selected device that the user is answering the communication establishment request:
         causing the first selected device to cease alerting the user; and
         causing a second selected device from the set of two or more computing devices to alert the user to the communication establishment request using a second alert schema.

10. The computing device of claim 9, wherein the first delay period is selected based upon learned device behaviors of the user.

11. The computing device of claim 9, wherein the first and second alert schemas are different alert schemas.

12. The computing device of claim 11, wherein the first and second alert schemas are chosen based upon learned device behaviors of the user.

13. The computing device of claim 11, wherein the first and second alert schemas are also chosen based upon a context of the user.

14. The computing device of claim 9, wherein the first alert schema comprises one of: auditory or non-auditory notification.

15. The computing device of claim 9, wherein the operations further comprise:
   selecting the second selected device from the set of two or more computing devices using the model trained with past device answer history that predicts, given the present context of the user, a device that will be successful in alerting the user.

16. A computing device for sequential ringing of computing devices in response to a communication request, the computing device comprising:
   means for receiving a communication establishment request directed to an identifier, the identifier assigned to each device in a set of two or more computing devices;
   means for selecting a first selected device from the set of two or more computing devices using a model trained with past device answer history that predicts, given a present context of a user, a device that will be successful in alerting the user;
   means for causing the first selected device to alert the user to the communication establishment request using a first alert schema, wherein the devices in the set of two or more computing devices other than the first selected device are not caused to alert;
   after waiting a first delay period specified by the first alert schema without receiving an indication from the first selected device that the user is answering the communication establishment request:
      means for causing the first selected device to cease alerting the user; and
      means for causing a second selected device from the set of two or more computing devices to alert the user to the communication establishment request using a second alert schema.

17. The computing device of claim 16, further comprising:
   means for selecting the second selected device from the set of two or more computing devices using the model trained with past device answer history that predicts, given the present context of the user, a device that will be successful in alerting the user.

* * * * *